United States Patent [19]

Ferro

[11] Patent Number: 4,943,598

[45] Date of Patent: Jul. 24, 1990

[54] RECURABLE AND CURED CELLULAR MATERIALS

[75] Inventor: Gregory A. Ferro, Hoffman Estates, Ill.

[73] Assignee: Imi-Tech Corporation, Elk Grove, Ill.

[21] Appl. No.: 389,983

[22] Filed: Aug. 7, 1989

Related U.S. Application Data

[62] Division of Ser. No. 240,802, Sep. 6, 1988.

[51] Int. Cl.$^5$ .................................................. C08J 9/36
[52] U.S. Cl. .................................... 521/184; 521/185; 521/189; 521/918
[58] Field of Search ................ 521/184, 185, 189, 918

[56] References Cited

U.S. PATENT DOCUMENTS

| | | | |
|---|---|---|---|
| 4,070,312 | 1/1978 | Gagliani | 521/185 |
| 4,319,000 | 3/1982 | Gagliani et al. | 521/185 |
| 4,708,972 | 11/1987 | Gagliani | 521/185 |

*Primary Examiner*—Morton Foelak
*Attorney, Agent, or Firm*—Richard J. Hammond; John F. Sieberth

[57] ABSTRACT

Cured polyimide foam is exposed to an atmosphere of steam at elevated temperature and pressure for a period of time sufficient to convert the foam into a non-flexible, non-resilient recurable cellular material. Preferably the process is conducted such that the cellular material is recurable to a flexible resilient foam having tensile strength properties similar to the tensile strength properties of the original cured polyimide foam subjected to the process. Before recuring, the non-flexible, non-resilient recurable cellular material may be shaped or contoured, and then recured. For example, by impressing shaped articles into the recurable material followed by recuring, shipping/storage containers for the articles are readily produced.

4 Claims, No Drawings

RECURABLE AND CURED CELLULAR MATERIALS

This application is a division of application Ser. No. 240,802 filed Sept. 6, 1988.

TECHNICAL FIELD

This invention relates to the conversion of cured polyimide foams into recurable cellular materials, to the curing of such structures and to uses therefor. Other aspects and features of this invention will be apparent from the ensuing description and appended claims.

BACKGROUND

As is well known, polyimide foams are usually produced by forming a polyimide precursor and converting the precursors to a foamed polyimide structure. Usually the precursor is in essence a mixture of a tetracarboxylic acid or suitable derivative thereof and one or more primary diamines with or without a foaming agent. On heating this mixture these components interact with each other and volatile components are released within the precursor so that a foamed intermediate structure (usually composed of a polyamic acid/ester) is formed which on further heating is transformed into a cured polyimide foam.

THE INVENTION

A method for converting polyimide foams into non-flexible, non-resilient recurable cellular materials has now been discovered. This discovery has made it possible to develop a wide variety of new foamed polyimide structures and applications for such structures as well as methods for the production of such structures. Another embodiment of this invention is a non-flexible, non-resilient foam produced by this method.

In accordance with still another embodiment of this invention, there is provided a process which comprises exposing cured polyimide foam to an atmosphere of steam at elevated temperature and pressure for a period of time sufficient to convert said foam into a non-flexible, non-resilient recurable cellular material, and subsequently recuring said cellular material. In one preferred embodiment this process is conducted such that said cellular material is recurable to a flexible resilient foam having physical properties similar to the physical properties of the original cured polyimide foam subjected to the process. Looking at the matter in a different way, a preferred embodiment of this invention involves conducting the foregoing process in such a way that the glass transition temperature of the original cured polyimide as determined by differential scanning calorimetry is reduced to a glass transition temperature falling within a predetermined range of glass transition temperatures for said original cured polyimide, and is thereupon discontinued.

Pursuant to yet another embodiment, this invention provides a process comprising (i) exposing cured polyimide foam to an atmosphere of steam at elevated temperature and pressure for a period of time sufficient to convert said foam into a non-flexible, non-resilient recurable cellular material, (ii) shaping or contouring said cellular material, and (iii) curing the shaped or contoured cellular material into a shaped or contoured cured polyimide foam. Still another embodiment is a shaped or contoured cured polyimide foam produced by this process. Particularly preferred is a process of this character which is conducted such that in (i) said recurable cellular material is recurable to a flexible, resilient foam having physical properties similar to the physical properties of the original cured polyimide foam used in (i), and such that in (iii) said shaped or contoured cellular material is cured into a shaped or contoured cured polyimide foam having physical strength properties similar to the physical properties of the original cured polyimide foam used in (i).

In still another embodiment, this invention provides a fire-resistant, impact-resistant shipping/storage package which comprises at least one article to be shipped/stored, said article being at least partially encased in a cured resilient polyimide foam having a cavity therein shaped and contoured to at least a portion of the shape and contour of said article. Preferably the article is fully encased in at least two sections of the foam each of which has a cavity shaped and contoured to a different portion of the shape and contour of the article.

And a still further embodiment is a fire-resistant, impact-resistant shipping/storage container which comprises a cured resilient polyimide foam having a cavity therein shaped and contoured to at least a portion of the shape and contour of an article to be shipped/stored in said container. Preferably the container comprising at least two sections of the foam each of which has a cavity therein shaped and countoured to a different portion of the shape and contour of the article.

Other objects and embodiments will appear hereinafter.

A feature of this invention is that a polyimide foam which possesses a combination of desirable physical properties, is converted by a hydrolytic process under controlled elevated temperature and pressure conditions into a foamed polymeric material which is devoid of these properties. Nevertheless, the resultant foamed polymeric material by virtue of its malleability and pliability, can easily be shaped or contoured or changed into another desired shape or configuration and, surprisingly, transformed while in this shape or configuration into a corresponding shaped or configured cured polyimide foam. Moreover, by suitable control of the hydrolytic conditions employed, the final shaped or contoured polyimide foam can have properties such as tensile strength which are similar to the corresponding physical properties possessed by the original polyimide foam. Moreover, if conducted under the appropriate controlled conditions of time, temperature and pressure, the steaming or hydrolytic treatment utilized pursuant to this invention, can be repeated over and over again on the same polyimide foamed artifact.

The conditions used in converting the initial foamed polyimide into the non-flexible, non-resilient foamed material will vary depending upon the makeup of the initial polyimide foam. In general, however, the initial polyimide foam is usually placed in a sealed reaction vessel such as an autoclave and treated with steam at a suitable combination of temperature and pressure conditions to transform the original foam into a foamed material which can readily be penetrated by a foreign object. While in this condition the foam can be shaped or impressed into a desired configuration which is then "set" by subjecting the shaped or impressed foamed mass to thermal curing to reconvert the material into a polyimide foam. In conducting the transformation from polyimide foam to the shapeable or contourable foam, it is desirable—though not essential for some applications—to conduct the pressure and steaming under conditions which do not pass the point of no return. That is to say, if the pressurized steam hydrolysis is carried out under excessively severe conditions (e.g., using an excessive set of time temperature-pressure conditions or using an excessive period of time) the resultant foamed structure may not be recurable into a polyimide foam. So long as it is recurable into a polyimide foam, it falls within the ambit of this invention. But in accordance with the preferred embodiments of this invention, the conditions used in the steam hydrolysis are such that the resultant foamed structure can be transformed, by thermal curing, into foamed polyimide having tensile strength properties comparable to those of the original polyimide foam.

In many cases a convenient way of gauging the extent of the pressurized steam hydrolysis of the initial polyimide foam is to monitor the progress of this reaction by means of differential scanning calorimetry. For example, as the pressured steaming operation is being conducted, samples of the foam may be examined by means of a differential scanning calorimeter such as a Mettler TA-3000 System with a TC 10A Processor.

In general, the non-resilient, non-flexible foam formed in the steam treatment will, at least when using foams of the type described in the Examples hereinafter, have a consistency somewhat like lightly packed snow.

In conducting the pressurized steam hydrolysis, it is convenient to subject the initial polyimide foam to the action of steam in a closed system such as an autoclave. The time-temperature-pressure conditions may vary from one type of foamed polyimide polymer to another. With polyimide foams of the type described in the Examples hereinafter, temperatures in the range of about 260° to about 274° C. (pressures in the range of about 680 to about 849) psia will be employed. The time periods used will of course depend on the temperature and pressure used, and the properties desired in the resultant non-flexible, non-resilient foamed material to be produced therefrom. Thus for a given cured polyimide foam, the higher the temperature and pressure, the shorter may be the steam treatment time. And, if it is desired to produce a non-flexible, non-resilient foamed material that can be cured to a polyimide foam having tensile strength properties comparable to those of the initial foam, the time of exposure to a given set of steam temperature-pressure conditions will be shorter than if it is desired to form a recurable non-flexible, non-resilient foamed material that can be recured to a polyimide foam which does not have tensile strength properties generally as good as those of the initial cured polyimide foam.

If desired, the steam to which the initial cured polyimide foam is exposed may be diluted with other gaseous or vaporous materials, such as air, nitrogen, argon, neon, methanol, or the like.

It is to be noted that the recured polyimide foams produced by the process of this invention can repeatedly be subjected to the steam treatment and recuring steps, over and over again.

Having described the basic concepts of the invention, reference is now made to the following examples which are provided by way of illustration, but not by way of limitation of the practice of the invention.

EXAMPLE I

The samples used in these runs were based on cured polyimide foams made from a lower alkyl ester of benzophenone tetracarboxylic acid (predominantly di-methyl ester), 4,4'-methylenedianiline and 2,6-diaminopyridine in a mol ratio of about 1.0:0.7:0.3, respectively. Six such samples were placed in a sealed autoclave and subjected to steam at 270° F. (about 132° C.) for 4 hours. After each hour, the glass transition temperature (Tg) of the foam was determined by differential scanning calorimetry with a Mettler TA-3000 System with a TC 10A Processor, using the 50% Tg values reported by the system. After the third hour, and again at the end of the fourth hour, separate portions of these six foams were removed from the autoclave and recured in a thermal oven at 525° F. (about 274° C.) for 45 minutes. The tensile properties of the resultant cured foams were then determined by ASTM test procedure D-3574 using an Instrom model 1122 universal tester with a 50-pound load cell.

Table 1 shows the Tg values for the initial polyimide foam samples, the Tg values of these materials after 1, 2, 3, and 4 hours of exposure to the pressurized steam, and the Tg values or the foams that were recured after 3 and 4 hours of steam exposure, respectively. The results of the tensile strength measurements are shown in Table 2.

TABLE 1

| | Glass Transition Temperatures, °C. | | | | |
|---|---|---|---|---|---|
| Sample | Before Autoclave | Autoclave 1 Hour | Autoclave 2 Hours | Autoclave 3 Hours | Autoclave 4 Hours |
| 1 | 268.9 | 264.0 | 260.9 | 258.8 | 260.1 |
| 2 | 273.4 | 267.5 | 262.8 | 262.4 | 256.2 |
| 3 | 273.0 | 265.2 | 261.7 | 260.6 | 260.1 |
| 4 | 270.3 | 268.4 | 268.1 | 262.2 | 260.0 |
| 5 | 269.3 | 265.4 | 265.3 | 265.0 | 253.7 |
| 6 | 272.8 | 266.6 | 263.4 | 262.9 | 255.3 |
| | | | Sample | Recured | Recured |
| | | | 1 | 286.7 | 286.3 |
| | | | 2 | 286.1 | 283.6 |
| | | | 3 | 286.5 | 285.5 |
| | | | 4 | 286.3 | 285.6 |
| | | | 5 | 284.9 | 287.4 |
| | | | 6 | 286.7 | 284.9 |

TABLE 2

| | Tensile Strength, (psi) | |
|---|---|---|
| Sample | Recured After 3 Hours Autoclave | Recured After 4 Hours Autoclave |
| 1 | 11.7 | 8.4 |
| 2 | 11.7 | 11.5 |
| 3 | 12.3 | 10.4 |
| 4 | 12.1 | <1.0 |
| 5 | 12.6 | 7.7 |
| 6 | 11.5 | <1.0 |

The data in Table 2 indicate that under the conditions used, all six recured samples that had been steam treated for 3 hours exhibited tensile strength properties similar to the tensile strength properties of the original cured polyimide foams. On the other hand, although all of the six samples that had been steamed treated for 4 hours were recurable, only recured Samples 2 and 3 retained tensile properties similar to the initial foams from which they were formed. Recured Samples 1 and 5 had lower tensile strengths and the tensile strengths of Samples 4 and 6 were very low.

EXAMPLE II

A series of runs were conducted generally as in Example I except that the samples were exposed to pressurized steam in the autoclave for a total of 6 hours, and tensile strength measurements were made on all samples. The initial cured polyimide foam had a Tg of 275.36° C. and a tensile strength of 9.08+0.40 psi. When this foam was subjected to the recuring conditions (without having been exposed to steam) it had a Tg of 280.43° C. and a tensile strength of 8.9+1.07 psi. The results of the runs involving use of the steam treatment are summarized in Table 3.

TABLE 3

| Sample | Glass Transition Temperatures, °C. | | | Tensile Strength, psi | |
|---|---|---|---|---|---|
| | Initial | After Autoclave | After Recuring | After Autoclave | After Recuring |
| 1 Hr. | 275.19 | 271.95 | 284.80 | 9.84 + 1.66 | 10.16 + 1.55 |
| 2 Hrs. | 276.33 | 268.24 | 280.74 | 7.26 + 1.35 | 8.88 + 0.64 |
| 3 Hrs. | 274.92 | 265.20 | 277.81 | 6.13 + 1.02 | 7.23 + 0.61 |
| 4 Hrs. | 274.15 | 261.86 | 280.36 | <1.0 | 9.15 + 0.55 |
| 5 Hrs. | 279.40 | 263.27 | 281.29 | <1.0 | 11.09 + 0.80 |
| 6 Hrs. | 276.04 | 273.66 | 286.46 | <1.0 | <1.0 |

Using the general procedure of Example II, six samples (12"×6"×0.5" in size) of the cured polyimide foam were subjected to pressurized steam in the autoclave. After specified times of steam-treatment, the samples together with a control sample (not steam treated) were subjected to recuring conditions, and Tg and tensile strength measures were made on all samples. Tables 4 and 5 summarize the results so obtained.

TABLE 4

| | Glass Transition Temperatures, °C. | | | | | | |
|---|---|---|---|---|---|---|---|
| Sample | Before Autoclave | After Autoclave | | | | | |
| | | 1 Hr. | 2 Hrs. | 3 Hrs. | 4 Hrs. | 5 Hrs. | 6 Hrs. |
| Control | 275.4 | | | | | | |
| 1 | 275.2 | 271.9 | | | | | |
| 2 | 276.3 | | 268.2 | | | | |
| 3 | 274.9 | | | 265.2 | | | |
| 4 | 274.2 | | | | 261.9 | | |
| 5 | 279.4 | | | | | 263.3 | |
| 6 | 276.0 | | | | | | 273.7 |
| | After Thermal Recure | | | | | | |
| | | 1 Hr. | 2 Hrs. | 3 Hrs. | 4 Hrs. | 5 Hrs. | 6 Hrs. |
| Control | 280.4 | | | | | | |
| 1 | | 284.8 | | | | | |
| 2 | | | 280.7 | | | | |
| 3 | | | | 277.8 | | | |
| 4 | | | | | 280.4 | | |
| 5 | | | | | | 281.3 | |
| 6 | | | | | | | 286.5 |

TABLE 5

| | Tensile Strength, (psi) | | | | | | |
|---|---|---|---|---|---|---|---|
| Sample | Before Autoclave | After Autoclave | | | | | |
| | | 1 Hr. | 2 Hrs. | 3 Hrs. | 4 Hrs. | 5 Hrs. | 6 Hrs. |
| Control | 9.1 | | | | | | |
| 1 | | 9.8 | | | | | |
| 2 | | | 7.3 | | | | |
| 3 | | | | 6.2 | | | |
| 4 | | | | | <1.0 | | |
| 5 | | | | | | <1.0 | |
| 6 | | | | | | | <1.0 |
| | After Thermal Recuring | | | | | | |
| | | 1 Hr. | 2 Hrs. | 3 Hrs. | 4 Hrs. | 5 Hrs. | 6 Hrs |
| Control | 9.0 | | | | | | |
| 1 | | 10.2 | | | | | |
| 2 | | | 8.9 | | | | |
| 3 | | | | 7.2 | | | |
| 4 | | | | | 9.2 | | |
| 5 | | | | | | 11.1 | |
| 6 | | | | | | | <1.0 |

It can be seen from the data in Table 5 that with the particular initial cured polyimide sample used and the particular conditions employed in the steam treatment, the recured material formed after 6 hours of steam treatment did not regain tensile strength similar to its original tensile strength. On the other hand, the samples steam treated for shorter periods of time did regain good tensile properties.

It can be seen from the data in Table 5 that with the particular initial cured polyimide sample used and the particular conditions employed in the steam treatment, the recured material formed after six hours of steam treatment did not regain tensile strength similar to its original tensile strength. On the other hand, the samples steam treated for shorter periods of time did regain good tensile properties.

EXAMPLE IV

Rectangular blocks of cured polyimide foam were subjected to pressurized steam as in the above Examples for 3 to 4 hours and cooled. Various objects, namely a valve made from Teflon fluoropolymer, a glass stirrer bearing, a glass stopcock, and an electronic board for a personal computer, were then impressed into the resultant non-flexible, non-resilient recurable cellular blocks. After removing the objects, the blocks were then recured at 275° C. for 45 minutes in a thermal oven. In each case, the resultant recured polyimide foam was found to be contoured to the shape of the object which had been impressed therein and was suitable for use as a shipping/storage container therefor.

Usually, as in Example IV, the objects used in the shaping or contouring will be removed from the recurable foam before conducting the curing operation. However, objects made of temperature-resistant materials may be left in place during the curing.

A variety of other useful products can be produced from the non-flexible, non-resilient recurable cellular materials producible by the steam-treatment process of this invention. For example, composite articles, laminates, foam-filled honeycomb, sound and/or heat insulation tiles and boards and the like can be formed therefrom, articles of the type dealt with in copending applications being contemporaneously filed by applicant.

The initial cured polyimide foams used in the practice of this invention can vary widely in composition. In general, they are produced from polyimide precursors composed of a mixture comprising at least (i) one or more organic tetracarboxylic acids or derivatives thereof, and (ii) one or more organic diamines co-reactive therewith, preferably including at least an aromatic or heterocyclic primary diamine. Components (i) and (ii) are usually present in the mixture in essentially stoichiometric quantities.

The organic tetracarboxylic acids or derivatives thereof are preferably based on aromatic tetracarboxylic acids having the general formula:

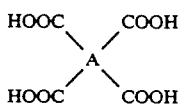

wherein A is a tetravalent organic group preferably an aromatic group. The tetravalent organic group A is most preferably an aromatic group having one of the following structures:

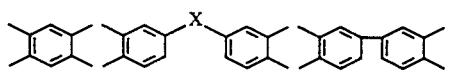

wherein X is one or more of the following:

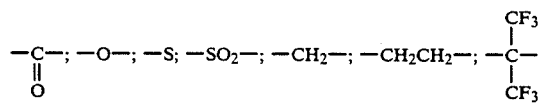

although other aromatic groups are suitable. The derivatives which may be employed include acid halides, acid salts, esters, and the like. Of these, esters are preferred and are most generally used for foam production.

The derivatives which may be employed include acid halides, acid salts, esters, and the like. Of these, esters are preferred and are most generally used for foam production.

Preferred among the tetracarboxylic acid esters are the alkyl esters of 3,3',4,4'-benzophenone tetracarboxylic acid, most preferably the lower alkyl diesters thereof. Mixtures of two or more aromatic esters, most preferably predominating in diesters, may be employed, if desired.

It is also possible, in accordance with this invention, that the tetracarboxylic acid derivative employed in the manufacture of the polyimide foams be a caprolactam as taught by U.S. Pat. Nos. 4,161,477, 4,183,838 and 4,183,839, the disclosures of which are incorporated herein by reference. As described in those patents, bis-imide is formed by reaction of a tetracarboxylic acid dianhydride with an oxoimine such as caprolactam and then reacted with the diamine or diamines to produce the desired polyimides. The caprolactam is displaced during the reaction, in much the same way as is the ester portion of the tetracarboxylic acid ester.

The tetracarboxylic acid derivative used in the manufacture of the initial polyimide foams employed in the practice of this invention may also be an N-substituted imido acid ester of the tetracarboxylic acid as taught by U.S. Pat. Nos. 4,647,597 and 4,656,198, the disclosures of which are incorporated herein by reference. As described in those patents, the N-substituted imido acid ester may be formed by reacting an aromatic tetracarboxylic acid dianhydride with an amino acid and an alcohol or mixture of alcohols. As further taught in those patents, on reaction of the imido acid ester with the diamine or diamines, the acid ester group bonded to the nitrogen atom of the N-substituted imido acid ester is displaced so that the desired polyimide is formed.

The organic diamines with which the foregoing mixture of tetracarboxylic acids or derivatives is employed may be represented by the formula:

$$H_2N-R'-NH_2$$

wherein R' is an aromatic group containing 5 to 16 carbon atoms and containing up to one hetero atom in the ring, the hetero atom being nitrogen, oxygen or sulfur. Also included are aromatic groups such as:

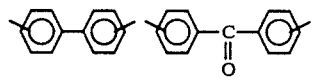

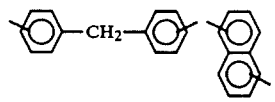

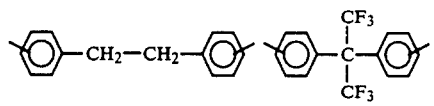

Representatives of such diamines include:
2,6-diaminopyridine;
3,5-diaminopyridine;
3,3'-diaminodiphenylsulfone;
4,4'-diaminodiphenylsulfone;
4,4'-diaminodiphenylsulfide;
3,3'-diaminodiphenylether;
4,4'-diaminodiphenylether;
meta-phenylenediamine;
para-phenylenediamine;
4,4'-methylene dianiline;
2,6-diamino toluene;
2,4-diamino toluene;
and the like.

It is also possible and sometimes desirable in the preparation of the polyimide precursors, to include in the reaction mixture one or more aliphatic diamines. Such aliphatic diamines are preferably alpha-omega diaminoalkanes having the formula:

$$H_2N-(CH_2)_n-NH_2 \qquad (I)$$

wherein n is an integer from 2 to 16. Representatives of such diamines include 1,3-diaminopropane, 1,4-diaminobutane, 1,5-diaminopentane, 1,6-diaminohexane, etc.

In place of or in addition to the foregoing aliphatic amines, use can be made of aliphatic etherified polyamines of the type polyoxypropylene amines having the formula:

$$H_2N-CH(CH_3)CH_2-[OCH_2CH(CH_3)]_x-NH_2 \qquad (II)$$

wherein x varies from 1 to about 5 carbon atoms.

Other useful primary diamines which may be included in the foams used in the practice of this invention include amino-terminated butadiene-nitrile copolymers having the general formula:

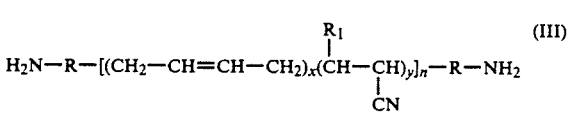

wherein R is either a phenylene group or an alkylene group, $R_1$ is hydrogen or methyl, and x and y or each independently integers ranging from 1 to 25 and n is an integer, preferably below 20. In these copolymers it is preferred that butadiene constitute at least 50% by weight of the butadiene and nitrile monomer. The nitrile monomer copolymerized with the butadiene can either be acrylonitrile or methacrylonitrile. Such copolymers generally have low molecular weights, preferably less than 3,000 to insure that they are sufficiently fluid to react in the formation of the polyimide as well as sufficiently fluid so as to be capable of foaming.

Still another type of primary diamines which may be included in the polyimide foams used in this invention is the aromatic amino-terminated silicones, such as those having the general formula:

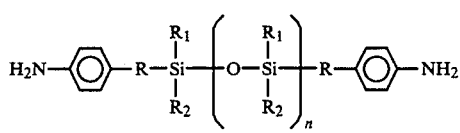
(IV)

wherein R is a $C_2$ to $C_6$ alkylene group, $R_1$ and $R_2$ are each independently lower alkyl containing 1 to 3 carbon atoms and n is an integer from 1 to 4.

Another preferred category of diamines which may be utilized in forming the foams for use in this invention are the diesters of an amino-substituted aromatic carboxylic acid and a polymethylene glycol. Such diesters may be represented by the general formula:

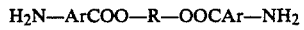
(V)

wherein R is an alkylene group (which may be branched or straight chain) and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups.

A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;
tetramethylene glycol-3-amino-4-nitrobenzoic acid diester;
tetramethylene glycol-3-amino-5-nitrobenzoic acid diester;
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester;
and the like. Mixtures of such diesters may be employed.

A particularly preferred diester of this type is the diester of trimethylene glycol (1,3-propanediol) and 4-aminobenzoic acid.

In producing the initial polyimide foams, the organic tetracarboxylic acid preferably in the form of its diester, most preferably from methanol or ethanol, is reacted with the above-referred-to amine(s) to form a prepolymer in the form of a consolidated, fragile foam structure, which is then subjected to additional heating in order to effect imide formation and thereby cure the polymer. When using the tetracarboxylic acid ester this operation can be conducted either in the presence or absence of an added blowing agent to provide the desired polyimide foam.

The relative proportions used in the preparation of the polyimide and polymers can be varied. In general, it is preferred to employ essentially stoichiometric proportions as between the mixture of tetracarboxylic acids or derivatives thereof and the primary diamine(s). However, non-stoichiometric mixtures can be used although the excess of the reactant present in excess usually does not participate in the reaction.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of organic or inorganic blowing agents. By use of a solid blowing agent such as Celogen TSH, Celogen TO, Celogen AZ 130, Celogen RA, Celogen HT 500, Celogen HT 550, sodium bicarbonate, benzenesulfonyl hydrazide, boric acid, benzoic acid, and Expandex 5 PT of controlled particle size, the homogeneity of the cellular structure of the resulting polyimide foam can be more accurately controlled. Preferred for such use are solid blowing agents which have been subjected to ball milling or other grinding so that the blowing agent is less than 200 microns in diameter, with 98 percent of the blowing agent particle sizes being less than 150 microns in diameter.

The chemical compositions of the blowing agents identified by trade name above follow:

| Blowing Agent | Chemical Composition |
| --- | --- |
| Celogen TSH | toluenesulfonyl hydrazide |
| Celogen OT | p,p'-oxybis(benzenesulfonyl hydrazide) |
| Celogen AZ 130 | azodicarbonamide |
| Celogen RA | p-toluenesulfonyl semicarbazide |
| Celogen HT 500 | a modified hydrazine derivative |
| Celogen HT 550 | hydrazol dicarboxylate |
| Expandex 5 PT | 5-phenyltetrazole |

Variations in the concentration of the blowing agent can be used to achieve specific densities and ILD values. Concentrations of up to 10 percent based on the weight of the polyimide precursor, and preferably 1 to 5 percent, can be employed. A concentration of about 2.5 weight percent is particularly preferred.

Hydrated organic compounds of the type referred to in U.S. Pat. No. 4,621,015 may also be used as blowing agents in forming polyimide foams suitable for use in the practice of this invention.

The initial foams may contain various filler and/or reinforcing materials. For example, graphite, glass and other synthetic fibers can be added to the precursor composition to produce a fiber-reinforced product. Microballons may be added for density adjustment, if desired. It is frequently desirable to employ a surfactant thereby increasing cellular structure stability and uniformity, and increase fatigue resistance and make the foam more flexible and resilient. The nature of such surfactants for this use is well known and reported in the patent literature.

When producing foams from tetracarboxylic acids or derivatives thereof other than lower alkyl esters, a blowing agent and/or microballons should be employed in order to achieve a suitable cellular structure.

When producing foams from tetracarboxylic acids or derivatives thereof other than lower alkyl esters, a blowing agent and/or microballons should be employed in order to achieve a suitable cellular structure.

Although not necessary, for some applications it is desirable that the initial foam contain a suitable quantity of a flame retardant material in order to still further increase the flame resistance of the foam.

In preparing the polyimide precursors, it is preferred to employ the procedures and spray drying techniques described in U.S. Pat. No. 4,296,208, the disclosure of which is incorporated herein by reference.

The temperatures at which the precursor is converted to the polyimide foam are generally those temperatures used in the preparation of other polyimide polymers. As a general rule temperatures ranging from 200° to 400° C. can be used, with heating times from 5 to 60 minutes or longer. As those skilled in the art will appreciate, the time for carrying out the reaction is somewhat dependent upon the reaction temperature, higher temperatures enabling the use of shorter reaction times. It is also possible to heat to a lower temperature in the first stage of the reaction and then to higher temperatures in the later stages.

Heating can be carried out in a conventional oven if desired. Alternatively, the foaming and curing of the precursor into a foamed polyimide polymer can be effected by means of microwave heating. In this technique, the precursor is exposed for 1 to 120 minutes to radio frequencies within the range of 915 to 2450 mHz, with the power output ranging from 1 to 100 kw. The power output to prepolymer weight ratio generally falls within the range of 0.1 to 10 kw per kg.

The specific details concerning the production of polyimide foams have been extensively described in the literature and foams suitable for use in the practice of this invention are available as articles of commerce (SOLIMIDE Foam). In practicing this invention, all that is required is that the initial cured polyimide foam be convertible to a non-flexible, non-resilient recurable cellular material when subjected to steam treatment under appropriate conditions of time, temperature and pressure.

It will be apparent that this invention is susceptible to considerable variation in its practice without departing from the spirit and scope of the appended claims, the forms described hereinbefore being merely exemplary of its practice.

What is claimed is:

1. A process which comprises (i) exposing cured polyimide foam which is composed of a polyimide of at least one aromatic tetracarboxylic acid or derivative thereof and at least one aromatic or heterocyclic primary amine to an atmosphere of steam at elevated temperature and pressure for a period of time sufficient to convert said foam into a non-flexible, non-resilient recurable cellular material, (ii) shaping or contouring said cellular material, and (iii) heating to recure the shaped or contoured cellular material in the absence of steam into a shaped or contoured cured polyimide foam.

2. A process according to claim 1 wherein said cured polyimide foam is composed of a polyimide of benzophenone tetracarboxylic acid or derivative thereof, 4,4'-methylenedianiline and at least one diaminopyridine.

3. A process according to claim 1 wherein said cured polyimide foam is composed of a polyimide produced from a lower alkyl ester of benzophenone tetracarboxylic acid, 4,4'-methylenedianiline and 2,6-diaminopyridine in a mol ratio of approximately 1:0.7:0.3, respectively.

4. A process according to claim 1 conducted such that in (i) said recurable cellular material is recurable to a flexible, resilient foam having tensile strength properties similar to the tensile strength properties of the original cured polyimide foam used in (i), and such that in (iii) said shaped or contoured cellular material is cured into a shaped or contoured cured polyimide foam having tensile strength properties similar to the tensile strength properties of the original cured polyimide foam used in (i).

* * * * *